United States Patent [19]

Beal et al.

[11] Patent Number: 5,523,175

[45] Date of Patent: *Jun. 4, 1996

[54] PLATE-SHAPED FUEL CELL COMPONENT

[75] Inventors: Daniel Beal, East Hartford, Conn.; Ronald G. Martin, Monson, Mass.; Michael E. Gorman, Manchester, Conn.

[73] Assignee: International Fuel Cells Corporation, South Windsor, Conn.

[*] Notice: The term of this patent shall not extend beyond the expiration date of Pat. No. 5,264,299.

[21] Appl. No.: 184,900

[22] Filed: Jan. 21, 1994

Related U.S. Application Data

[63] Continuation of Ser. No. 813,464, Dec. 26, 1991, abandoned.

[51] Int. Cl.$^6$ .................................................. H01M 8/02
[52] U.S. Cl. ................................ 429/30; 429/36; 429/38
[58] Field of Search ................................ 429/36, 30, 35, 429/38, 34, 33; 427/115

[56] References Cited

U.S. PATENT DOCUMENTS

| | | | |
|---|---|---|---|
| 3,511,906 | 5/1970 | Bergemann et al. | 264/262 |
| 3,515,595 | 6/1970 | Sanford | 136/120 |
| 3,533,852 | 10/1970 | Baker et al. | 136/145 |
| 3,573,104 | 3/1971 | Snyder, Jr. et al. | 136/86 |
| 3,607,418 | 9/1971 | Ortlieb et al. | 136/86 |
| 3,846,176 | 11/1974 | Kohl | 136/86 |
| 3,867,206 | 2/1975 | Trocciola et al. | 429/35 |
| 4,225,654 | 9/1980 | Tajima et al. | 429/34 |
| 4,259,389 | 3/1981 | Vine et al. | 429/36 X |
| 4,346,150 | 8/1982 | Bellows et al. | 429/18 |
| 4,374,185 | 2/1983 | Powers et al. | 429/36 |
| 4,374,906 | 2/1983 | Breault et al. | 429/44 |
| 4,485,157 | 11/1984 | Moseley | 429/251 |
| 4,543,303 | 9/1985 | Dantowitz et al. | 429/34 |
| 4,555,324 | 11/1985 | Ueno et al. | 429/36 X |
| 4,579,788 | 4/1986 | Marianowski et al. | 429/36 X |
| 4,640,876 | 2/1987 | Warzawski et al. | 429/37 |
| 4,652,502 | 3/1987 | Breault et al. | 429/13 |
| 4,728,533 | 3/1988 | Feigenbaum et al. | 427/57 |
| 4,743,518 | 5/1988 | Romanowski | 429/34 |
| 4,758,481 | 7/1988 | Fauvel | 429/39 |
| 4,774,154 | 9/1988 | Singelyn et al. | 429/36 |
| 4,781,727 | 11/1988 | Mitsuda et al. | 429/35 X |
| 4,786,568 | 11/1988 | Elmore et al. | 429/44 |
| 4,824,741 | 4/1989 | Kunz | 429/33 X |
| 4,826,742 | 5/1989 | Reiser | 429/33 |
| 4,978,591 | 12/1990 | Wright | 429/35 |
| 5,096,786 | 3/1992 | Granata, Jr. et al. | 429/35 |
| 5,264,299 | 11/1993 | Krasij et al. | 429/30 |

FOREIGN PATENT DOCUMENTS

| | | |
|---|---|---|
| 0110517 | 6/1984 | European Pat. Off. . |
| 1310419 | 10/1962 | France . |
| 1518333 | 3/1968 | France . |
| 7922508 | 4/1980 | France . |
| 1100600 | 1/1968 | United Kingdom . |
| 2236012 | 3/1991 | United Kingdom . |

*Primary Examiner*—Anthony Skapars

[57] ABSTRACT

A fuel cell component that includes a porous fuel cell plate and a solid frame contiguously extending all around the fuel cell plate is made by first forming an integral plate-shaped porous body including a central portion constituting the fuel cell plate and a peripheral portion integral with and circumferentially completely surrounding the central portion, and then impregnating the pores of only the peripheral portion with a quantity of initially flowable but solidifiable impregnating material such that the impregnating material is accommodated in and completely fills such pores and makes the peripheral portion solid and completely fluid-impermeable upon solidification of the impregnating material to constitute the frame.

5 Claims, 1 Drawing Sheet

PLATE-SHAPED FUEL CELL COMPONENT

The Government has rights in this invention pursuant to a contract awarded by the Department of the Air Force.

This application is a continuation of U.S. Ser. No. 07/813,464, filed Dec. 26, 1991, now abandoned.

TECHNICAL FIELD

The present invention relates to fuel cells in general, and more particularly to a plate-shaped fuel cell component including a porous plate and a frame surrounding the plate and to a method of making such a fuel cell component.

BACKGROUND ART

There are already known various constructions of fuel cells, among them such using a quantity of acid electrolyte and such employing a proton exchange membrane (hereinafter collectively referred to as "electric charge transfer body" for the sake of simplicity) confined between respective cathode and anode electrode plates. The general principles of construction and operation of such fuel cells are so well known that they need not be discussed here in any detail. Suffice it to say that a gaseous fuel and an oxidizing gas are supplied to the anode electrode plate and to the cathode electrode plate, respectively, and distributed as uniformly as possible over the active surfaces of the respective electrode plates (that is, the electrode plate surfaces that face the electric charge transfer body and each of which is usually provided with a layer of a catalyst), and that an electrochemical reaction takes place at and between such electrode plates, with attendant formation of a product of the reaction between the fuel and oxygen, release of thermal energy, creation of an electrical potential difference between the electrode plates, and travel of electric charge carriers between the electrode plates, wherein the thus generated electric power usually constitutes the useful output of the fuel cell.

The fuel cells of the type here consideration, regardless of the kind of the electric charge transfer body being used therein, have one thing in common, namely, the fact that at least the electrode plates used therein are porous. In acid fuel cells, such porosity is needed primarily to supply and distribute the respective gaseous media, which are fed to the areas of the cathode and anode electrode plates that face away from the acid electrolyte body, to the respective active surfaces, but often also to store some replenishment electrolyte and/or to provide for removal of the reaction product from one or the other of the active surfaces. On the other hand, in proton exchange fuel cells, where the gaseous media can be supplied directly to the active surfaces, the porosity is still needed for the reaction product (water) removal.

It will be appreciated that, when porous elements such as the aforementioned electrode plates are used in fuel cells, it is necessary to assure that neither any liquid, such as liquid electrolyte, nor any of the gaseous media, be able to flow out of the periphery of the respective porous element. In this respect, the possibility of the gaseous media escaping through or even reaching the periphery of the respective porous element is a more serious one of the conditions to be prevented, not only because such escape would result in a loss of a portion of the respective supplied gaseous medium with attendant reduction in the operating efficiency of the fuel cell, but also, and possibly more importantly, because the mixture of the gaseous fuel with the oxidizing gas or with ambient air could create a safety concern.

In recognition of this situation, it was already proposed, for instance in the U.S. Pat. No. 4,555,324 to Ueno et al, to externally coat each of at least some of the edge portions of fuel cell electrode plates with a layer of polytetrafluoroethylene or a similar substance that, at least in theory, prevents both liquids and gases from passing therethrough and thus from reaching the outer periphery of the thus coated electrode plate edge portion. However, experience has shown that, as advantageous as this approach may seem at the first glance, serious problems are encountered when it is attempted to implement this approach in practice, especially as far as the structural integrity and gas impermeability of the thus coated edge portion is concerned.

Another solution to this problem is disclosed, for example, in the U.S. Pat. No. 4,652,502 to Breault et al. This solution is based on the recognition of the fact that no serious detriment is encountered when a liquid, such as liquid electrolyte, is permitted to reach the periphery of the respective electrode plate, so long as it is assured that this liquid is prevented by capillary forces from actually flowing out through such periphery. Based on this recognition, it is disclosed there that the edge regions of the electrode plates are densified by the introduction into the pores of such regions an impregnating liquid substance which, after curing or similar treatment, leaves behind a residue that only partially fills the pores but permits the aforementioned liquid to penetrate into and fill the remainder of such reduced-size pores, thus forming a so-called wet seal. This wet seal and the surface tension or capillary forces associated therewith then prevent any gaseous medium from penetrating from the interior to the exterior of the respective electrode element. Even here, however, the results are less than satisfactory, if for no other reason then because the liquid electrolyte or other liquid constituting the wet seal is able to reach the outer periphery of the fuel cell and, for instance, evaporate therefrom or cause other deleterious consequences.

Such problems are avoided by adopting an approach such as that disclosed, for instance, in the U.S. Pat. No. 4,640,876 to Warzawski et al where the plate-shaped porous electrode element is mounted in or on or supported by a solid frame which is separate and distinct from the electrode element but which is contiguous to the electrode element and completely circumferentially surrounds the same, thus in effect forming a plate-shaped fuel cell component therewith. Inasmuch as the frame, being solid, is impermeable to both liquids and gases, and because any interfaces between the frame and the plate surrounded thereby and/or between the adjacent frames juxtaposed with one another in a stack, can be sealed, the possibility of escape of any fluid, be it gas or liquid, to the periphery of the aforementioned plate-shaped fuel cell component can be avoided.

However, an arrangement like this also suffers of several disadvantages which, albeit different from those discussed above, detract from the technical and/or commercial feasibility of this approach. So, for instance, the very existence of the interfaces between the frame and the plate-shaped element, with attendant need for sealing such interfaces to prevent internal gas and/or liquid flow, adds to the complexity of the arrangement. Moreover, the periphery of the plate-shaped porous element is received in a recess of the frame so that shear stresses can occur at this location.

Accordingly, it is a general object of the present invention to avoid the disadvantages of the prior art.

More particularly, it is an object of the present invention to provide a plate-shaped fuel cell component which does not possess the disadvantages of the known components of this kind.

Still another object of the present invention is so to develop the component of the type here under consideration as to minimize the internal stresses therein.

It is yet another object of the present invention to design the component of the above type in such a manner as to be relatively simple in construction, inexpensive to manufacture, easy to use, and yet reliable in operation.

A concomitant object of the present invention is to devise a method of making the component of the above kind which is easy to perform.

DISCLOSURE OF THE INVENTION

In keeping with these objects and others which will become apparent hereafter, one feature of the present invention resides in a fuel cell component that includes a porous fuel cell plate and a solid frame contiguously extending all around the fuel cell plate. According to the invention, this component is constituted by an integral plate-shaped porous body including a central portion constituting the fuel cell plate and a peripheral portion integral with and circumferentially completely surrounding the central portion, and a quantity of initially flowable but solidifiable impregnating material accommodated in the pores of only the peripheral portion and completely filling such pores making the peripheral portion solid and completely fluid-impermeable upon solidification of the impregnating material to constitute the frame.

In accordance with another aspect of the present invention, there is provided a method of making a fuel cell component that includes a porous fuel cell plate and a solid frame contiguously extending all around the fuel cell plate, this method comprising the steps of forming an integral plate-shaped porous body including a central portion constituting the fuel cell plate and a peripheral portion that is integral with and circumferentially completely surrounds the central portion, and impregnating the pores of only the peripheral portion with a quantity of initially flowable but solidifiable impregnating material such that the impregnating material is accommodated in and completely fills such pores and makes the peripheral portion solid and completely fluid-impermeable upon solidification of the impregnating material to constitute the frame.

BRIEF DESCRIPTION OF THE DRAWING

The present invention will be described in more detail below with reference to the accompanying drawing, in which.

BEST MODE FOR CARRYING OUT THE INVENTION

Figure 1:
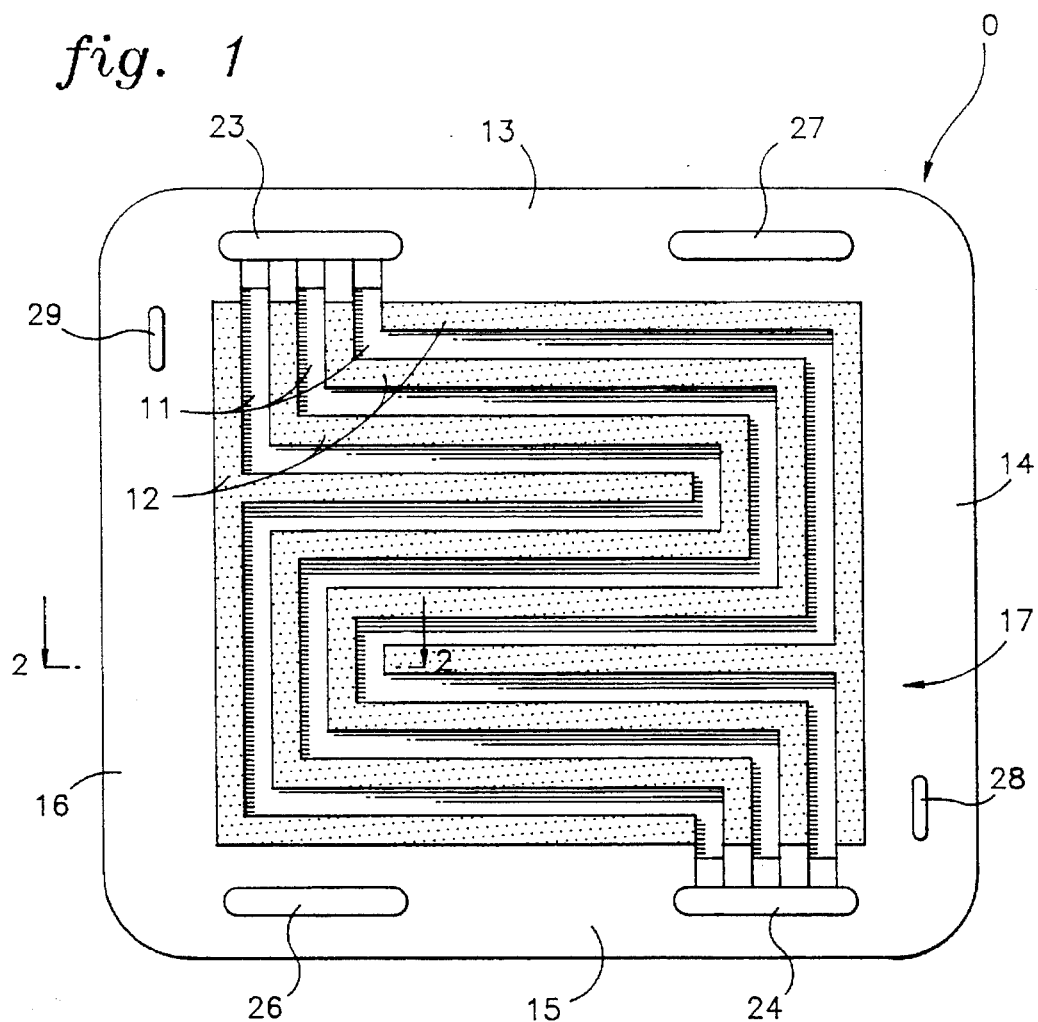
FIG. 1 is a somewhat simplified top plan view of an electrode plate embodying the present invention and constructed for use in a proton exchange membrane fuel cell, taken on line 1—1 of FIG. 2.

Referring now to the drawing in detail, and first to FIG. 1 thereof, it may be seen that the reference numeral 10 has been used therein to identify a plate-shaped fuel cell component embodying the present invention. The fuel cell component 10 will be described below as constructed for use in a proton exchange membrane fuel cell; however, it should be realized that the concepts and expedients discussed herein in this particular context also have applicability to fuel cells of other types, especially to acid electrolyte fuel cells.

As already alluded to before, all fuel cells of the type here under consideration require the presence of porous elements, such as backing plates. Graphite is the material favored for these backing plates in the proton exchange membrane and acid electrolyte fuel cells, particularly for its rather high electrochemical stability in these applications, light weight, and relatively low cost.

Backing plates serve to transmit and withstand axial loads, to conduct electrical current and, more often than not, also to provide reactant gas channels, such as those indicated at 11 in FIG. 1 of the drawing, which are bounded and separated from one another by respective partition regions 12. The porosity of the respective backing plate then facilitates the distribution of the respective reactant gas to all regions of the respective catalyst that is situated between the backing plate and the electrolyte body or a similar electric charge carrier transfer body, such as a proton exchange membrane, that is, even to those regions that are juxtaposed with the partition regions 12 or with other regions of the component 10. Moreover, in fuel cells employing liquid electrolytes, at least some of the backing plate pores are also being used to accommodate replenishment electrolyte, that is, electrolyte in excess of that originally contained in the electrolyte body and used during the operation of the fuel cell to replenish electrolyte that had been lost from the electrolyte body. On the other hand, in solid polymer membrane fuel cells with passive water flow management, the porosity of the backing plate, in conjunction with proper pore size selection in the affected region, is also being used to provide a wet seal that separates the reactant gases from the liquid water system at such region.

However, as already explained in some detail before, the porosity of the backing plate also could have certain disadvantageous consequences, especially if it were permitted to exist in edge regions 13 to 16 of the component 10 to the same degree as in an active region 17 of the component 10, that is, that region at which the desired electrochemical reaction is to take place. To avoid such undesirable consequences, the edge regions 13 to 16 of the component 10 are made solid and both liquid and gas impermeable.

Figure 2:
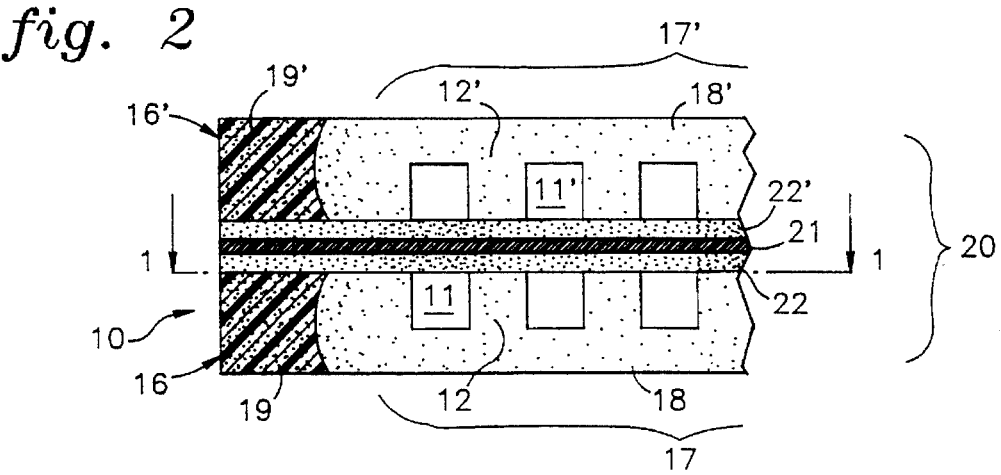
FIG. 2 is a cross-sectional view of a fragment of a fuel cell incorporating the electrode plate of FIG. 1, taken generally on line 2—2 of FIG. 1 but at a different scale therefrom.

In accordance with the present invention, this is achieved in the manner illustrated in FIG. 2 of the drawing, in which the same reference numerals as before but distinguished from one another by the presence or absence of primes have been used to denote those parts or portions of two associated plate-shaped components 10 and 10' of a proton exchange membrane fuel cell 20 which structurally and/or operationally correspond to one another. As depicted there, the components 10 and 10' include respective substantially uniformly porous bodies 18 or 18' provided, at their surfaces facing one another and within respective-active regions 17 or 17' thereof, with respective reactant gas channels 11 or 11'. In accordance with the present invention, the edge regions 16 and 16' of the respective porous bodies 18 or 18' (and, similarly, the edge regions 13 to 15 and their counterpart edge regions 13' to 15' that are not visible in FIG. 2) of the respective porous bodies 18 or 18' are made solid and fluid impermeable by impregnating them with respective quantities of a then liquid but curable material, followed by curing such material to completely fill and solidify in the pores of the edge regions 13 to 16 and 13' to 16', thus in effect forming respective solid and fluid impermeable frame portions, such as those identified by the reference numerals 19 and 19'.

The impregnation can be accomplished in various known ways, such as by dipping the respective edge regions 13 to 16 and 13' to 16' in succession in a bath of the liquid impregnating material, causing such material to wick into the pores, or forcing the impregnating material (by applying positive pressure thereto or by drawing it by subatmospheric pressure) into the pores. In any event, the process utilized must be such as to assure complete filling of the pores of the edge regions 13 to 16 and 13' to 16' by the impregnating material but to simultaneously avoid plugging of the pores in the respective active regions 17 and 17' of the components 10 and 10'.

It will be appreciated that the type of the impregnating material that is to be used for impregnating and solidifying the edge regions 13 to 16 and 13' to 16' must be be chosen with regard to the conditions encountered in the particular fuel cell type during its operation. Of course, since the solidified impregnating material may come in contact with various media, such as hydrogen, oxygen, water, and/or acid electrolyte during the operation of the fuel cell, it must be invulnerable to such media, that is, it must neither be dissolved by nor react with such media at least in its solidified state. Moreover, to be able to perform its sealing function when solidified, the impregnating material must not, in the course of the solidification process, either shrink or release solvents or other liquid or gaseous substances, at least not to such an extent that the released substances would form interconnected escape passages in the respective edge regions 13 to 16 or 13' to 16', because the presence of such interconnected passages would then allow at least some of the aforementioned media to flow therethrough while the fuel cell is in operation. Also, the solidified impregnating material must be able to withstand, and retain its functions at, the operating temperatures to which it is exposed or caused to reach during the operation of the respective fuel cell. An additional requirement that is to be satisfied at least in proton exchange membrane fuel cells that use passive water removal is that the cured impregnating material be wettable (hydrophilic) in order not to interfere with the operation of wet seals employed in this situation by impairing the bubble pressure thereof.

Experience has shown that at least some of the impregnating materials that satisfy the above criteria and are well suited for being used in acid electrolyte and proton exchange membrane fuel cell applications fall into the general category of resins. A material commercially available from the 3M Company under the trademark Fluorel has been found to be well suited for use as the impregnating material in the acid fuel cell environment. Epoxy resins have been found to satisfy the criteria to be met by an impregnating material to be used in the case of the proton exchange membrane fuel cell 20.

Subsequent developments based on the present invention have resulted in the discovery of additional impregnating materials that can be used in practicing the present invention and at least some of which may be even better suited to satisfy the above criteria than the materials specifically mentioned before. A number of such additional impregnating materials is presented in a commonly assigned copending patent application Ser. No. 07/813,465, now U.S. Pat. No. 6,219,674 filed on an even date herewith, the disclosure of which is incorporated herein by reference to the extent needed to clarify or support the present invention. Generally speaking, the potentially suitable impregnating materials include liquid phenolics, liquid phenolic/furfuryl systems, thermosetting resins, thermoplastic resins, fluroelastomers, elastomers such as silicone compounds and natural or synthetic rubber compounds, and incorporated cure resin systems.

FIG. 2 of the drawing also shows that a proton exchange membrane 21, sandwiched between two catalyst support plates or components 22 and 22' that, as is well known, carry respective catalyst formations at their major surfaces facing the proton exchange membrane 21, is interposed between the components 10 and 10'. While it would be sufficient, at least in theory, for the components 22 and 22' to be present only at the regions substantially coextensive with the active regions 17 and 17' of the backing components 10 and 10', what is actually shown in FIG. 2 of the drawing is a situation where the components 22 and 22' are at least coextensive with substantially all of the backing components 10 and 10'. Inasmuch as the components 22 and 22' are porous to be able to perform their function, at least some of the advantages stemming from resorting to the present invention would be lost if liquids or gases were permitted to escape to the outside of the fuel cell 20 through the edge regions of such components 22 and/or 22'. Therefore, care must be taken to prevent such possibility, which can be achieved in a variety of ways, for instance, by using wet seals. However, it is advantageous in this respect to solve this problem in a manner that is not depicted in the drawing but is similar to that proposed here and/or that described in a commonly owned U.S. patent application Ser. No. 07/813,470, filed on an even date herewith, the entire disclosure of which is incorporated herein by reference.

The construction described above has a number of important advantages. For one, inasmuch as the frame portions 13 to 16 or 13' to 16' are constituted by integral portions of the same bodies 18 or 18' as the flow fields or active regions 17 or 17' of the components 10 or 10', any shear stresses that are often encountered when they are separate and distinct from one another because of the effects of manufacturing tolerances or the like are eliminated, while those attributable to thermal effects are, if not eliminated, then at least greatly reduced. Another important advantage, which is also a direct result of the integral construction, is the avoidance of the otherwise existing need to seal the interfaces between the separate frames and backing plates. Also, at least in some fuel cell applications, there is no longer any need for providing wet seals at or next to the frame portions or edge regions 13 to 16 or 13' to 16'. Moreover, inasmuch as the impregnation results in the formation of relatively smooth surfaces at the edge regions 13 to 16 or 13' to 16', the components 10 and 10' of different fuel cells can be easily bonded to one another or to other fuel cell components thereat, using resin or thermoplastic films or other bonding agents, thus providing leakage-free seals at the respective interfaces.

Still another advantage obtained from using the approach according to the present invention is that, inasmuch as the edge regions 13 to 16 and 13' to 16' are not only solid but also fluid impermeable, they can be provided, as indicated in FIG. 1 of the drawing, with internal manifolds or other channels or passages 23 to 29 that are needed to supply the various media used or produced in the fuel cell 20 to, or discharge them from, the active regions 17 and 17', thus avoiding the otherwise existing need for providing external manifolds or the like and sealing the respective interfaces between them and the various surfaces of the fuel cells 20 arranged in a fuel cell stack. All in all, the approach proposed in accordance with the present invention results in a great simplification of the construction of the fuel cell 20 or the stack of such fuel cells 20 and in a significant enhancement in the operational reliability thereof.

While the present invention has been illustrated and described as embodied in a particular construction of a fuel cell, it will be appreciated that the present invention is not limited to this particular example; rather, the scope of protection of the present invention is to be determined solely from the attached claims.

We claim:

1. In a fuel cell backing component including a porous fuel cell plate and a solid frame contiguously extending all around the fuel cell plate, the improvement comprising:

an integral plate-shaped porous body including a central portion constituting the fuel cell plate, said central portion having a plurality of gas distribution channels therein, and a peripheral portion integral with and circumferentially completely surrounding said central portion; and a quantity of initially flowable but solidifiable impregnating material fills the pores of only said peripheral portion, such that said peripheral portion is solid and completely fluid-impermeable upon solidification of said impregnating material.

2. The improvement as defined in claim 1, wherein said impregnating material is of the type that releases at most such a low amount of any volatile substances during the solidification thereof that no escape passages that could compromise the fluid impermeability of the frame are formed in said peripheral portion.

3. The improvement as defined in claim 2 for use in a proton exchange membrane fuel cell, wherein said impregnating material is hydrophilic.

4. The improvement as defined in claim 3, wherein said impregnating material is an epoxy resin.

5. In a proton exchange membrane fuel cell backing component including a porous fuel cell plate and a solid frame contiguously extending all around the fuel cell plate, the improvement comprising:

an integral plate-shaped porous body including a central portion constituting the fuel cell plate, said central portion having a plurality of gas distribution channels therein, and a peripheral portion integral with and circumferentially completely surrounding said central portion; and a quantity of initially flowable but solidifiable impregnating material, where said impregnating material is hydrophilic and fills the pores of only said peripheral portion, such that said peripheral portion is solid and completely fluid-impermeable upon solidification of said impregnating material.

* * * * *